(12) United States Patent
Daunert Armillas et al.

(10) Patent No.: US 11,420,268 B2
(45) Date of Patent: Aug. 23, 2022

(54) KIT TO ASSIST IN THE MANUAL CHANGE OF A TOOL FROM A ROTARY TOOL HOLDER

(71) Applicant: DAUNERT MAQUINAS HERRAMIENTAS, S.A., Cornellà de Llobregat (ES)

(72) Inventors: Maximilian Daunert Armillas, Cornellà de Llobregat (ES); Martín Crecente Rodriguez, Barberà del Vallès (ES)

(73) Assignee: DAUNERT MAQUINAS HERRAMIENTAS, S.A., Cornella de Llobregat (ES)

( * ) Notice: Subject to any disclaimer, the term of this patent is extended or adjusted under 35 U.S.C. 154(b) by 63 days.

(21) Appl. No.: 16/978,553

(22) PCT Filed: Mar. 6, 2019

(86) PCT No.: PCT/EP2019/055575
§ 371 (c)(1),
(2) Date: Sep. 4, 2020

(87) PCT Pub. No.: WO2019/170749
PCT Pub. Date: Sep. 12, 2019

(65) Prior Publication Data
US 2021/0016366 A1   Jan. 21, 2021

(30) Foreign Application Priority Data
Mar. 6, 2018   (EP) ..................................... 18382136

(51) Int. Cl.
*B23B 31/06*  (2006.01)
*B23B 31/02*  (2006.01)
*B25B 33/00*  (2006.01)

(52) U.S. Cl.
CPC ............ *B23B 31/06* (2013.01); *B23B 31/021* (2013.01); *B23B 2260/078* (2013.01); *B25B 33/005* (2013.01); *Y10T 279/3431* (2015.01)

(58) Field of Classification Search
CPC ..... B23B 31/021; B23B 31/023; B23B 31/06; B23B 2260/078; B25B 33/005;
(Continued)

(56) References Cited

U.S. PATENT DOCUMENTS 3,499,223 A * 3/1970 Lieb ...................... F16C 27/066
433/129
5,383,383 A * 1/1995 Garuglieri ............... B25B 13/48
83/666

(Continued)

FOREIGN PATENT DOCUMENTS

| DE | 3622582 A1 | 12/1987 | |
|---|---|---|---|
| DE | 102010031805 B3 | 1/2012 | |
| FR | 1238934 A * | 8/1960 | ........... B23B 31/202 |
| GB | 778092 A | 7/1957 | |
| JP | 2007/044803 A | 2/2007 | |

OTHER PUBLICATIONS

International Search Report and Written Opinion dated Jun. 14, 2019 for International Application No. PCT/EP2019/055575, 12 pages.

*Primary Examiner* — Eric A. Gates
(74) *Attorney, Agent, or Firm* — Squire Patton Boggs (US) LLP (57) ABSTRACT

A known rotary tool holder (10) comprises a rotary tool gripper (11) and a non-rotary part (16) presenting a flat front wall (18), the rotary tool gripper projecting from the flat front wall and comprising a shaft segment (15) having two shaft flats (12, 13). A kit to assist in the manual change of a tool from such a rotary tool holder comprises a forked holding element (20) provided with two fingers (22, 23) that are suitable to be fitted by their inside on the two shaft flats, and a locking plate (30) that comprises a recess (31) and is
(Continued)

suitable to be fixedly mounted on the front wall with the recess facing it, said recess being configured to house the two fingers fitted on the two shaft flats when the locking plate is mounted on the front wall, the recess extending across the locking plate and being delimited by two steps (32, 33) against which the two fingers can be fitted by their outside.

17 Claims, 5 Drawing Sheets

(58) Field of Classification Search
CPC .......... Y10T 279/15; Y10T 279/17931; Y10T 279/17941; Y10T 279/3431
See application file for complete search history.

(56) References Cited

U.S. PATENT DOCUMENTS

| | | | | |
|---|---|---|---|---|
| 6,264,208 | B1* | 7/2001 | Sakamaki | B23B 31/201 |
| | | | | 279/146 |
| 6,302,407 | B1* | 10/2001 | Hsueh | B23B 31/123 |
| | | | | 279/140 |
| 9,452,511 | B2* | 9/2016 | Nguyen | B25B 13/50 |
| 9,751,198 | B2* | 9/2017 | Gerber | B25B 23/10 |
| 2006/0056932 | A1 | 3/2006 | Neumeier | |
| 2009/0224491 | A1* | 9/2009 | Thiel | B23B 45/006 |
| | | | | 279/62 |
| 2010/0272506 | A1 | 10/2010 | Honma | |

* cited by examiner

KIT TO ASSIST IN THE MANUAL CHANGE OF A TOOL FROM A ROTARY TOOL HOLDER

CROSS-REFERENCE

This application is a 35 USC 371 national phase filinci of PCT/EP2019/055575 filed on Mar. 6, 2019, which claims the benefit of and priority to European Patent Application No. EP18382136.2 filed on Mar. 6, 2018. PCT/EP2019/055575 and EP18382136.2 are incorporated herein by reference in their entirety.

The present disclosure relates to a kit to assist in the manual change of a tool from a rotary tool holder, the latter comprising a rotary tool gripper and a non-rotary part presenting a flat front wall, the rotary tool gripper projecting from the front wall and comprising a shaft segment that has two shaft flats and defines an axial direction, i.e. the direction of the axis of the shaft.

BACKGROUND

Tools in a machine tool can be rotary and non-rotary. Rotary tools are mounted on a tool holder that has a rotary part and a non-rotary part. The rotary part comprises a shaft that is normally provided with two parallel opposed flats to allow an open-ended spanner to hold the shaft. The tool is fastened into a clamping element located at the nose of the shaft. The manual changing of the tool involves applying a torque to the shaft, which in principle would yield and rotate idly and would not allow the tool change, unless this idle rotation is prevented. Therefore, the operator is forced to hold the shaft with one hand (the hand that is clasping the spanner) while arduously changing the tool with the other hand, which is not very safe because the spanner can slip off the flats, thus causing the shaft to rotate uncontrollably, with the consequent risk that one or both hands will hit something and get injured.

US2006056932A1 discloses a double-hooked wrench 57 (FIGS. 8 and 9) having a L-shaped form with two legs 58 extending at right angles in respect to each other, each of which has an inward pointing protrusion (or hook nose) 59 at the end. The distance between the two hook noses 59 is matched to the spacing of some circumferential grooves 22 of a cylindrical spindle 2 (for supporting a tool in a tool holder), in such a way that only one hook nose engages one such groove, while the other hook nose rests on the cylindrical surface of the spindle. Depending on which of the two hook noses engages one of the grooves, the spindle is arrested in the one or the other direction of rotation, with the result that both hands are free for actuating a tensioning nut 10. An elongated hole 60 is provided symmetrically between the two legs 58 along the bisecting line 61 of the right angle formed by the two legs. The double-hooked wrench is placed with its elongated hole 60 on a threaded bolt 62 which projects from a front face of the tool holder. With this arrangement, there is still a sizable risk that the double-hooked wrench 57 would slip on the bolt 62 away from the spindle and the hook nose 59 would disengage from the groove 22, thus releasing the spindle, with the consequent danger of injury to one of both hands of the operator. There is also the risk that, with the machine tool in operation, the double-hooked wrench 57 would slip on the bolt 62 towards the spindle and one hook nose 59 would accidentally engage one groove 22 of the spinning spindle, with the consequent damage to the tool holder and the danger of injury to the operator.

SUMMARY

It is an object of the present disclosure to provide a kit or device to prevent one or more of the aforementioned risks.

In a first aspect, a kit is provided to assist in the manual change of a tool from a rotary tool holder, said holder comprising a rotary tool gripper and a non-rotary part presenting a flat front wall, the rotary tool gripper projecting from said front wall and comprising a shaft segment that has two shaft flats and defines an axial direction, wherein the kit comprises a forked holding element provided with two holding fingers that are suitable to be fitted by their inside on the two shaft flats, and a locking plate that comprises a recess and is suitable to be fixedly mounted on the front wall with the recess facing the latter. The recess is configured to house the two fingers fitted on the two shaft flats when the locking plate is mounted on the front wall. The recess extends across the locking plate and is delimited by two steps against which the two fingers can be fitted by their outside.

In other words, when mounted on the front wall the locking plate encompass the shaft flats, and the recess forms, together with the front wall, a housing for the two fingers as fitted on the two shaft flats.

When the two fingers are fitted by their inside on the respective shaft flats, the holding element is made rotatably integral with the shaft, and it follows that preventing the holding element from rotating (e.g. by abutting against the steps of the recess) implies preventing the shaft from rotating as well. The inner distance between the two fingers may be suitably bigger than the distance between the two shaft flats, so as to procure the inside fitting of the former on the latter. The distance between the two steps may be suitably bigger than the outer distance between the two fingers, so as to procure the outside fitting of the latter in the former.

In an example, the two fingers and the two steps may be configured for the outside fitting of the two fingers against the two steps to be looser than the inside fitting of the two fingers on the two shaft flats.

In an example, the fingers may be suitable to fit in the axial direction when they are housed in the recess. This fitting may be tighter than the outside fitting of the fingers in the steps of the recess.

It may happen that the non-rotary part of the tool holder does not directly comprise a flat front wall but a curved (e.g. convex) front wall, but then an additional piece, having a flat face and a curved face adapted to fit on said curved wall, can be provided to be attached to the curved wall by the curved face and present the flat face to the rotary tool gripper, and so to make the non-rotary part to indirectly present a flat front wall onto which the locking plate can be readily mounted.

When fitted onto the shaft flats, the holding element is intended to be rotatably integral with the shaft for manual, slow rotations of the shaft, i.e. adjustment rotations. It is clear that, with the holding element locked in the housing formed by the recess of the locking plate (when the latter is mounted on the flat front wall), this locking also prevents the shaft (and the tool gripper) from rotating, which then allows the machine operator to use both hands to change the tool in the locked tool gripper.

The holding element can be only partly housed in the mounted locking plate, meaning that a part of the holding element may be inserted in the mounted locking plate and another part of the holding element may remain outside the mounted locking plate. The part of the holding element to be housed in the mounted locking plate may be substantially U-shaped or V-shaped.

In an example, the holding element may comprise a handle and this handle may be located opposite the fingers, so that the handle would remain outside the mounted locking plate while the fingers are housed therein.

The fingers may be parallel or non-parallel, depending on the shaft flats, and they may be of equal or different length and may or may not extend flush with each other.

The non-rotary part of the tool holder is normally attached to a solid surface of the machine-tool and the flat front wall is integral with said non-rotary part, whereby the housing formed by the locking plate when mounted on the flat front wall can lock the holding element, and thus the tool gripper, for rotation.

In a second aspect, to change the tool, an operator would or might perform the following operations:

1. Perhaps mounting the locking plate on the flat front wall, thus forming the aforementioned housing for the holding element when fitted on the shaft flats, although the locking plate would normally have been mounted at an earlier time and left mounted, as the mounted locking plate may be configured to not interfere with the normal operation of the tool and/or the rotary tool gripper.
2. Fitting the holding fingers onto the shaft flats, e.g. spanner-like, whereby the holding element is made rotatably integral with the tool gripper and the latter is prevented from rotating beyond the position in which the fingers engage the steps in the recess, that is, the locking plate rotatably locks the holding element and the tool gripper together.
3. Using the two hands to dismount the tool from the tool gripper, as the latter is locked for rotation and does not need to be held.
4. Using the two hands to mount the tool on the tool gripper.
5. Extracting the holding element from the locking plate, thus releasing the tool gripper.
6. Perhaps dismounting the locking plate from the flat front wall, although it is not usually necessary to dismount the locking plate because, once the holding element is out of the mounted locking plate, the locking plate alone does not affect the operation of the tool in the rotary tool gripper.

It can be seen that this procedure is much safer and more user-friendly than the known ways of changing the tool. These steps are method steps and are not to be confused with the abutting steps of the recess.

As already mentioned, the recess forms a housing for the holding element when the locking plate is mounted on the flat front wall. The shaft flats need to be properly aligned for the operator to be able to slide the holding element onto them.

In an example, the locking plate may comprise a hole with a diameter greater than the diameter of the tool gripper, in order to allow the latter to pass axially through the hole when the locking plate is carried over the tool gripper and up to the front wall, so as not to interfere with the tool gripper. This may further allow the locking plate to be a unitary piece.

In another example, the locking plate may comprise two pieces configured to be joined around the tool gripper without interfering therewith, and to be simultaneously mounted on the front wall. In this case, the two pieces of the locking plate may be brought together sideways.

In an example, the locking plate may comprise at least one internal conduit to convey a cooling liquid to the tool. In this way the locking plate would double as a cooling block.

In another example, the kit may comprise a block having at least one internal conduit to convey a cooling liquid to the tool. In this case the cooling block would be added to the locking plate. Like the locking plate, or indeed any component that needs to be carried over the tool gripper, this block would comprise a hole with a diameter greater than the diameter of the tool gripper.

In an example, the kit may comprise a spacer configured to be fixedly mounted on the non-rotary part of the tool holder.

In an example, this spacer may comprise a flat front wall that would act as the flat front wall onto which the locking plate is to be mounted. So, if for instance the non-rotary part of the tool holder does not comprise a flat front wall, this spacer would provide the flat front wall against which the locking plate can form the aforementioned housing for the holding element (the spacer would be the piece having a curved face and a flat face discussed above).

A tool holder may comprise a rotary tool gripper and a non-rotary part presenting a front wall, the rotary tool gripper projecting from said front wall and comprising a shaft segment having two flats, wherein the tool holder further comprises a kit according to the above description.

Further advantages, properties, aspects and features of the present disclosure may be derived from the below-described examples. The above-described features and/or the features disclosed in the claims and/or in the following description of examples can, if required, also be combined with one another even if this is not expressly described in detail.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
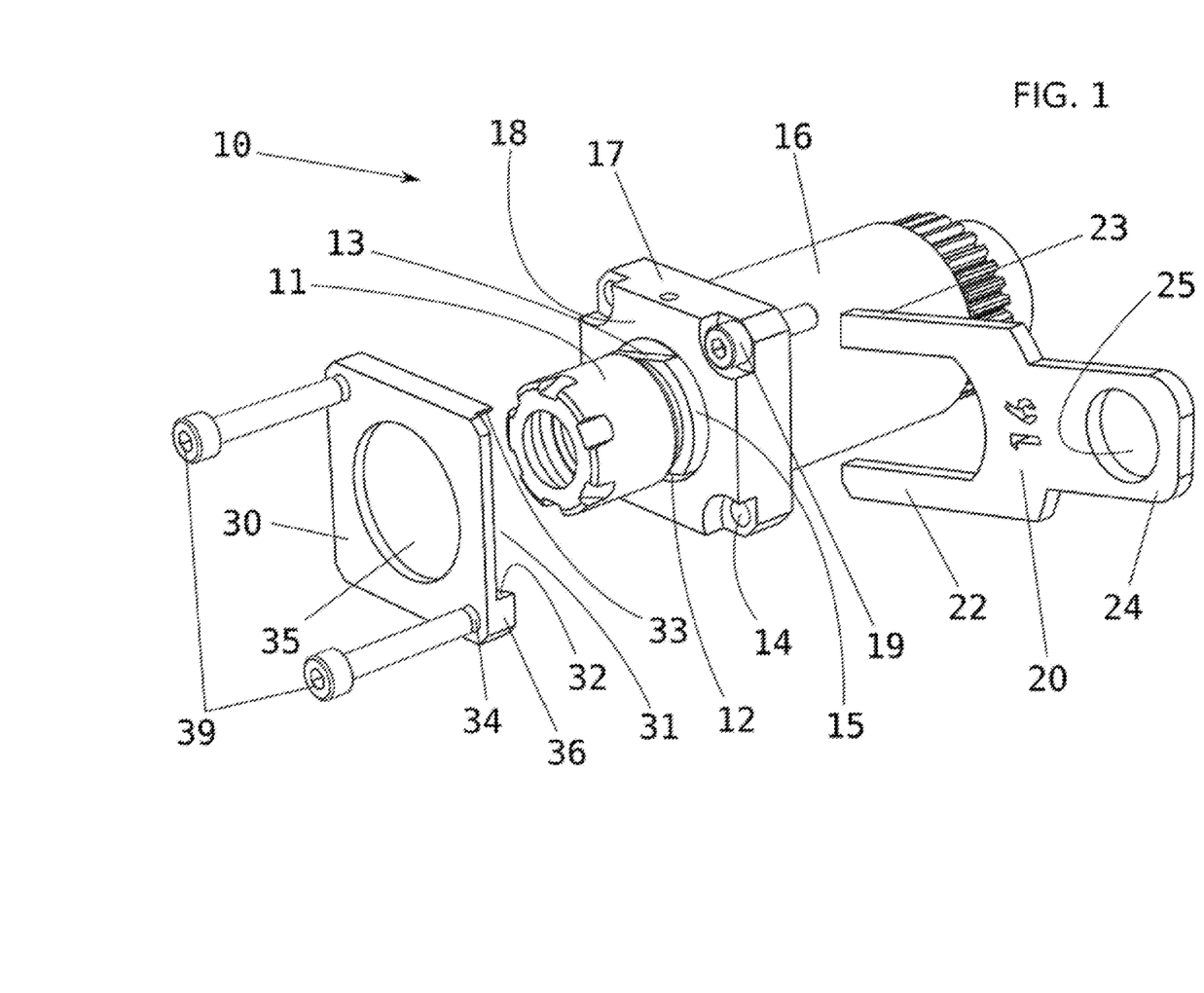
FIG. 1 is an exploded view of a rotary tool holder with an example of the present disclosure.
Figure 2:
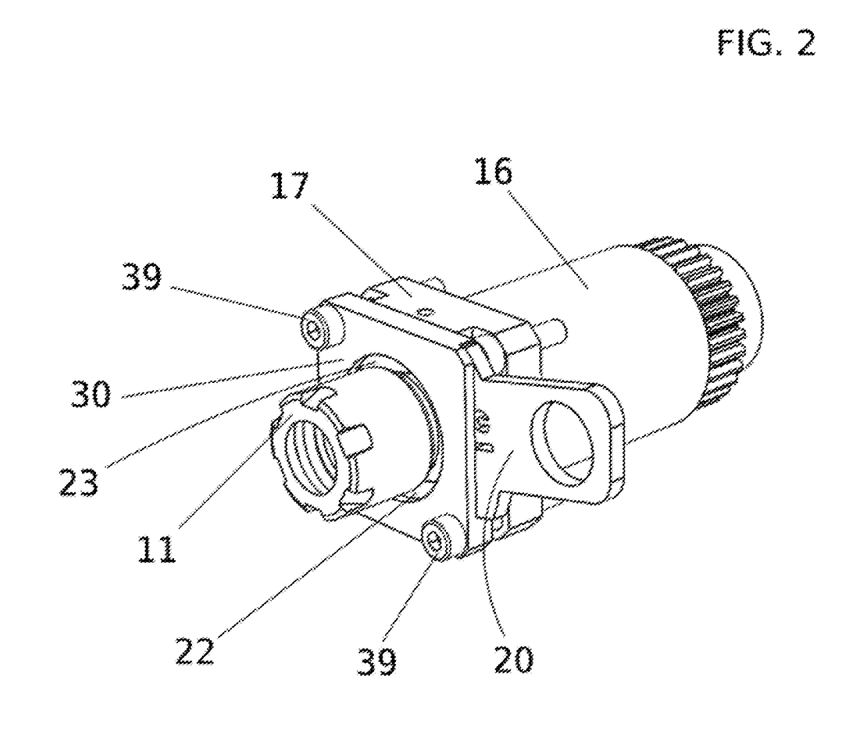
FIG. 2 is like FIG. 1 but with the different members mounted in place.

FIGS. 1 and 2 show a tool holder 10 for holding a tool (not shown) in a machine tool (not shown). The tool holder 10 is of the rotary type (also called driven tool holder) and comprises a rotary tool gripper 11 and a non-rotary part 16. The non-rotary part 16 comprises a flange 17 to fasten the tool holder to a solid and stationary surface of the machine tool. The flange 17 is of a generally square shape (although the particular shape is not important, what counts is that the flange 17 is wider than the rest of the non-rotary part 16 and projects radially therefrom) and is provided with four perforations 14, one at each corner, to accommodate corresponding bolts 19 and 39 that fixedly fasten the flange 17 to the machine tool. The flange 17 comprises a flat front wall 18 that is facing the rotary tool gripper 11, which projects from said front wall. The rotary tool gripper 11 includes a shaft 15 provided with two diametrically opposed shaft flats, a first flat 12 and a second flat 13, that are located just outside the front wall 18 of the flange 17. The axis of the shaft 15 defines an axial direction.

A proposed kit for facilitating the change of the tool in the rotary tool gripper 11, and for making it safer, comprises a generally square locking plate 30 and a forked holding element 20. The locking plate 30 comprises two perforations 34 for attachment to the flat front wall 18 by means of two corresponding bolts 39. The two bolts 39 actually fasten both the locking plate and the flange to the aforementioned stationary surface of the machine tool through two of perforations 14 (the other two bolts 19 fasten just the flange to said surface through the other two perforations 14). The locking plate 30 is provided with a central hole 35 that can receive the tool gripper 11, that is, the diameter of the hole 35 is slightly larger than the diameter of the tool gripper 11 in order to allow the locking plate 30 to be carried over the tool gripper 11.

Figure 5A:
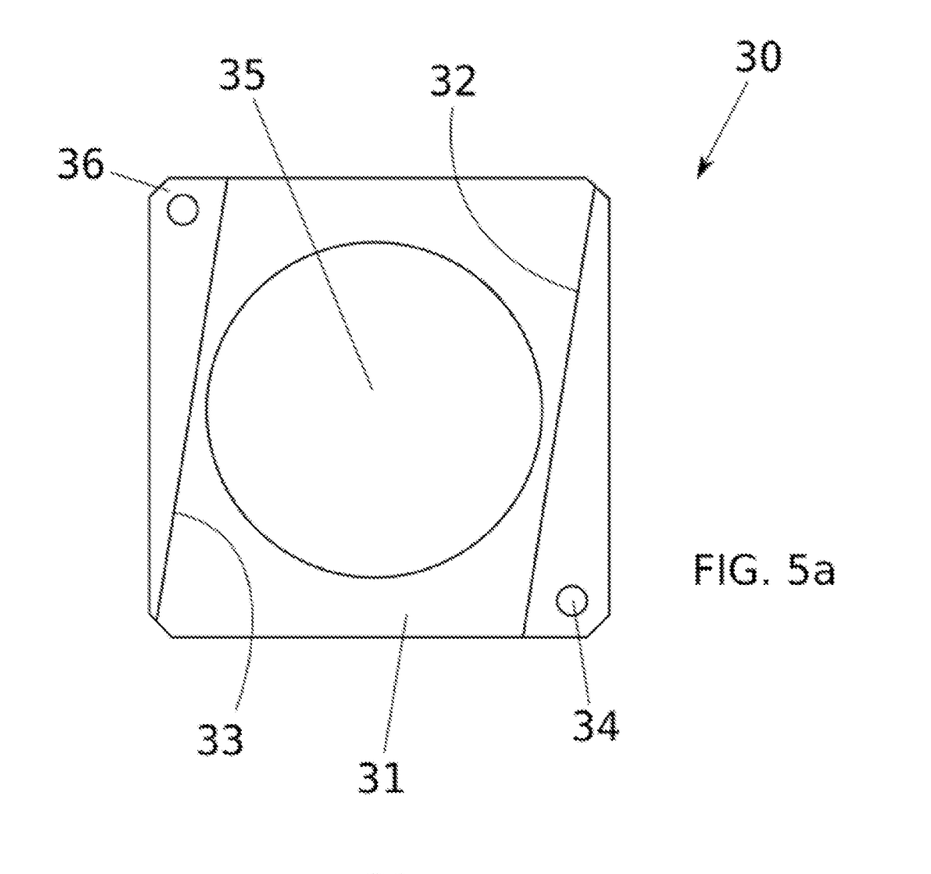
FIG. 5a is a top view of one side of a locking plate.
Figure 5B:
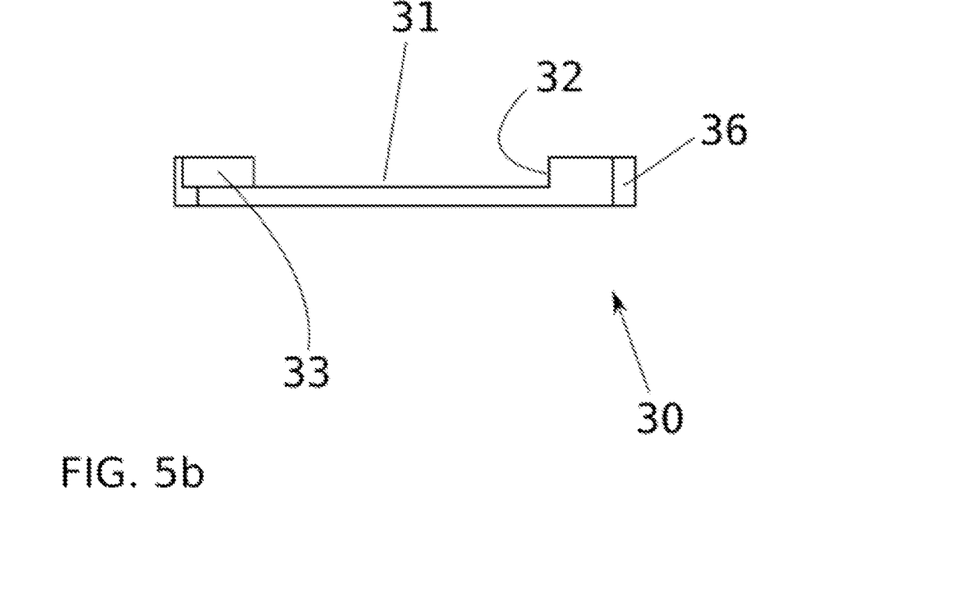
FIG. 5b is a side view of said locking plate.

With further reference to FIGS. 5a and 5b, the locking plate 30 comprises a recess 31 on the side thereof that is to face the flat front wall 18. The recess 31 extends across the plate 30 and defines a first step 32 and a second step 33. The recess 31 has a main direction that is inclined with respect to the square directions of the plate 30, in order to leave space for the two perforations 34 in the two corresponding thick corners 36 of the plate. When the locking plate 30 is mounted on the front wall 18, the recess 31 and the front wall 18 together form a relatively spacious housing for the two shaft flats 12 and 13.

The holding element 20 is fork-like and comprises a first finger 22 and a second finger 23. The two fingers 22 and 23 are so disposed as to fit onto the two shaft flats 12 and 13, the finger 22 on the flat 12 and the finger 23 on the flat 13, spanner-like. The holding element 20 further comprises a handle 24 provided with a hole 25.

The housing defined by the recess 31 and the flat front wall 18 is spacious enough to receive the two fingers 22 and 23 fitted by their inside on the two shaft flats 12 and 13 (this 'spaciousness' is manifested in the radial direction but not in the axial direction, since the holding element 20 is to be housed with little looseness in the axial direction). In this disposition, the two fingers 22 and 23 are more or less fitted by their outside on the two steps 32 and 33 of the recess 35, the finger 22 on the step 32 and the finger 23 on the step 33. This fitting is looser than the fitting of the fingers by their inside on the shafts flats 12 and 13. The holding element 20 is also fitted relatively tightly in the axial direction, limited by the flat front wall 18 and the bottom of the recess 31.

The locking plate 30 can be left mounted on the flat front wall 18 because it does not hinder the normal operation of the tool holder 10. In particular, the locking plate 30 does not by itself interfere with the rotation of the tool gripper 11. When the operator has to change the tool from the tool gripper 11, he/she will insert the fingers 22 and 23 into the recess 31 and onto the shaft flats 12 and 13 (after having properly aligned the shaft). In this disposition, the holding element 20 can rotate only slightly (or very little) before the finger 22 abuts against the step 32 or the finger 23 abuts against the step 33, whereby the rotary tool gripper 11 is effectively locked for rotation by the combined action of the locking plate 30 and the holding element 20. This frees the operator from manually holding the rotary tool gripper 11 and allows him/her to use both hands for expressly changing the tool.

When the tool has been changed, the operator will extract the holding element from the recess 31 and the rotary tool gripper 11 will be ready to rotate again.

Figure 3:
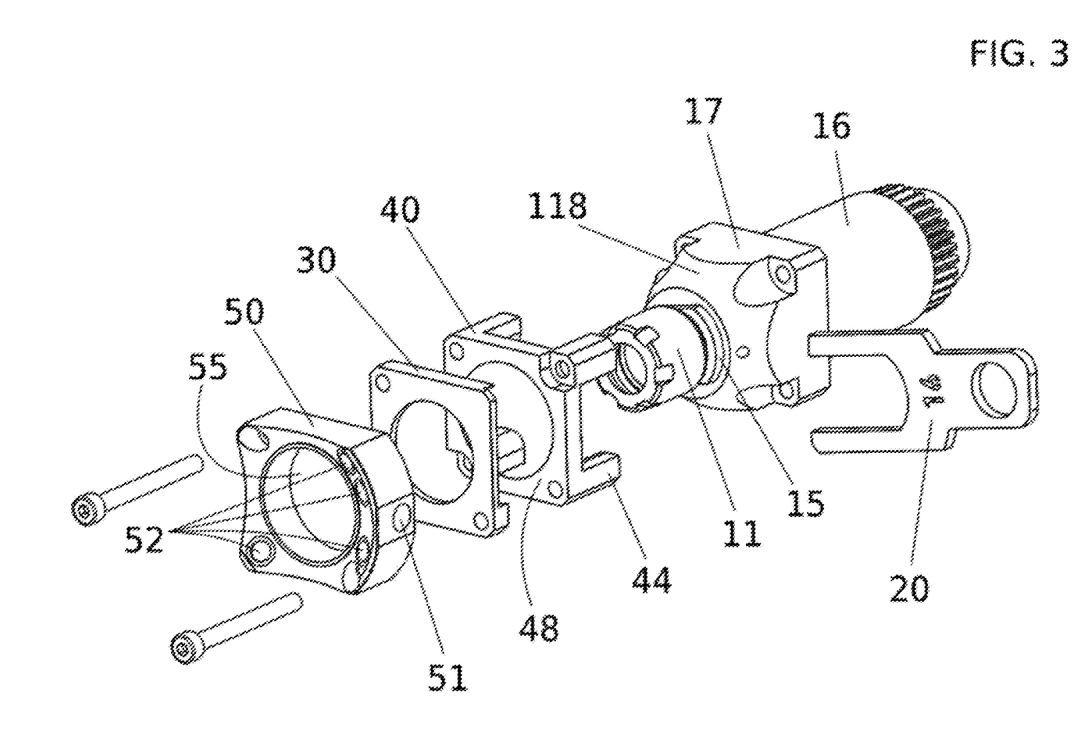
FIG. 3 is an exploded view of a rotary tool holder with another example of the present disclosure.
Figure 4:
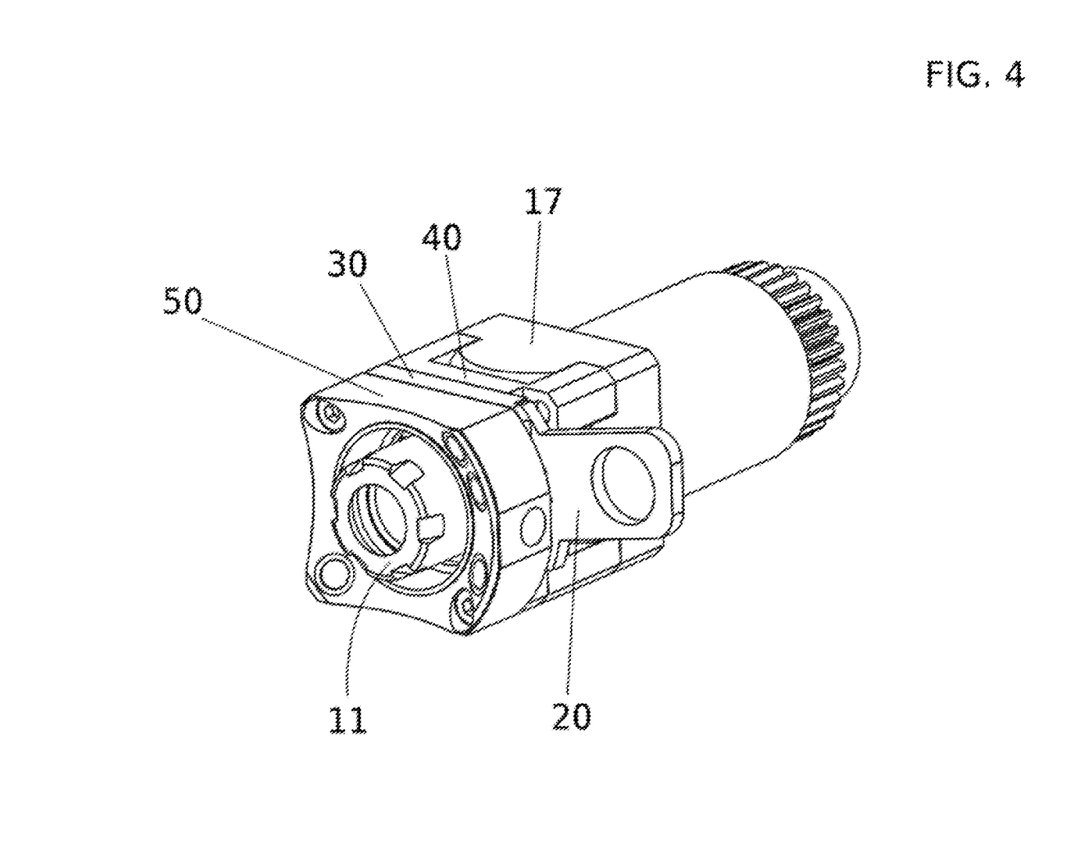
FIG. 4 is like FIG. 3 but with the different members mounted in place.

FIGS. 3 and 4 show a tool holder 10 similar (but no equal) to that of FIGS. 1 and 2, and a kit with the same locking plate 30 and holding element 20 of FIGS. 1 and 2 but with some additional components. The same of like components are given the same reference numeral.

The flange 17 of FIGS. 3 and 4 does not have a flat front wall but a convex front wall 118. A spacer 40 is intended to be fitted onto the convex front wall 118. The spacer 40 comprises four perforated legs 44 that reach down to the corresponding perforations 14 in the flange 17, and a flat front wall 48 that will cooperate with the recess 31 to form the housing for the fingers 22 and 23 of the holding element 20. This disposition will ensure a properly tight fitting of the holding element 20 in said housing in the axial direction. Of course, the two shaft flats 12 and 13 are located just outside the flat front wall 48 of the spacer 40, and this kit is operated exactly like the kit of FIGS. 1 and 2, just using the flat front wall 48 in place of the flat front wall 18.

FIGS. 3 and 4 further show a cooling block 50 to refrigerate the tool (not shown). This cooling block does not contribute to the locking of the tool gripper 11 and is only shown to illustrate that the locking plate 30 can be left mounted without hindering the normal operation of the tool. The cooling block 50 comprises an inlet 51 and four outlets 52 oriented toward the tool, so that the pressurized liquid coolant enters the block through the inlet 51 and leaves the block through the outlets 52 and onto the tool. The cooling block 50 could readily be added to the kit of FIGS. 1 and 2.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A kit to assist in the manual change of a tool from a tool holder, the latter comprising a rotary tool gripper and a non-rotary part presenting a flat front wall, the rotary tool gripper projecting from the flat front wall and comprising a shaft segment that is provided with two shaft flats and defines an axial direction, the kit comprising:

a forked holding element provided with two fingers, each of which has an inside surface and an outside surface, so that the two respective inside surfaces face each other and each outside surface has an orientation substantially opposite to that of its corresponding inside surface, each finger being suitable to be fitted by its inside surface on one shaft flat, and a locking plate that comprises a recess and is suitable to be fixedly mounted on the flat front wall with the recess facing it, said recess being configured to house the two fingers fitted on the two shaft flats when the locking plate is mounted on the flat front wall, the recess extending across the locking plate and being delimited by two steps against which the two fingers can be fitted by their outside surfaces.

2. The kit according to claim 1, wherein the fingers are suitable to fit in the axial direction when they are housed in the recess.

3. The kit according to claim 2, wherein the holding element comprises a handle that is located opposite the fingers.

4. The kit according to claim 3, wherein a part of the holding element comprising the fingers is U-shaped.

5. The kit according to claim 1, wherein the locking plate is a unitary piece that comprises a hole with a diameter greater than the diameter of the tool gripper.

6. The kit according to claim 1, comprising a spacer configured to be fixedly mounted on the non-rotary part of the tool holder.

7. The kit according to claim 6, wherein the spacer comprises a flat front wall and the locking plate is configured to be mounted on said flat front wall.

8. The kit according to claim 1, comprising a block having at an inlet to convey a cooling liquid to the tool.

9. A tool holder comprising:
    a rotary tool gripper, and
    a non-rotary part presenting a flat front wall, the rotary tool gripper projecting from the flat front wall and comprising a shaft segment that is provided with two shaft flats and defines an axial direction, a forked holding element provided with two fingers, each of which has an inside surface and an outside surface, so that the two respective inside surfaces face each other and each outside surface has an orientation substantially opposite to that of its corresponding inside surface, each finger being suitable to be fitted by its inside surface on one shaft flat, and
    a locking plate that comprises a recess and is suitable to be fixedly mounted on the flat front wall with the recess facing it, said recess being configured to house the two fingers fitted on the two shaft flats when the locking plate is mounted on the flat front wall, the recess extending across the locking plate and being delimited by two steps against which the two fingers can be fitted by their outside surfaces.

10. The tool holder according to claim 9, wherein the fingers are suitable to fit in the axial direction when they are housed in the recess.

11. The tool holder according to claim 9, wherein the locking plate is a unitary piece that comprises a hole with a diameter greater than the diameter of the tool gripper.

12. The tool holder according to claim 9, comprising a spacer configured to be fixedly mounted on the non-rotary part of the tool holder, the spacer comprising a flat front wall and the locking plate being configured to be mounted on said flat front wall.

13. Tool holder according to claim 9, wherein the locking plate comprises at least one internal conduit to convey a cooling liquid to the tool.

14. The tool holder according to claim 9, wherein the two fingers and the two steps are configured for the outside fitting of the two fingers against the two steps to be looser than the inside fitting of the two fingers on the two shaft flats.

15. A method of using a kit to assist in the manual change of a tool from a tool holder, the latter comprising a rotary tool gripper and a non-rotary part presenting a flat front wall, the rotary tool gripper projecting from the flat front wall and comprising a shaft segment that is provided with two shaft flats and defines an axial direction, the kit comprising a forked holding element provided with two fingers, each of which has an inside surface and an outside surface, so that the two respective inside surfaces face each other and each outside surface has an orientation substantially opposite to that of its corresponding inside surface, each finger being suitable to be fitted by its inside surface on one shaft flat, and a locking plate that comprises a recess and is suitable to be fixedly mounted on the flat front wall with the recess facing it, said recess being configured to house the two fingers fitted on the two shaft flats when the locking plate is mounted on the flat front wall, the recess extending across the locking plate and being delimited by two steps against which the two fingers can be fitted by their outside surfaces, the method comprising the following steps to be performed by an operator:

with the locking plate mounted on the front wall, fitting the fingers onto the shaft flats, whereby the holding element is made rotatably integral with the tool gripper and the latter is prevented from rotating beyond the positions in which the fingers engage the steps in the recess;

using two hands to dismount the tool from the tool gripper, as the latter is locked for rotation and does not need to be held;

using two hands to mount the same or another tool on the tool gripper;

extracting the holding element from the locking plate, thus releasing the tool gripper.

16. The method according to claim 15, comprising the step of, prior to the previous steps, mounting the locking plate on the front wall.

17. The method according to claim 16, comprising the step of, subsequent to the previous steps, dismounting the locking plate from the front wall.

* * * * *